Jan. 12, 1965 J. STARK, JR., ETAL 3,165,579

COLOR TELEVISION RECEIVER VIDEO AMPLIFIER

Filed Oct. 5, 1962 2 Sheets-Sheet 1

INVENTORS
JOHN STARK, JR.
GORDON E. KELLY
BY W. H. Sprague
ATTORNEY

COLOR TELEVISION RECEIVER VIDEO AMPLIFIER

Filed Oct. 5, 1962 2 Sheets-Sheet 2

INVENTORS
JOHN STARK, JR. &
GORDON E. KELLY
BY W. H. Sprenkle
ATTORNEY

United States Patent Office 3,165,579
Patented Jan. 12, 1965

3,165,579

COLOR TELEVISION RECEIVER VIDEO AMPLIFIER

John Stark, Jr., and Gordon E. Kelly, Indianapolis., Ind., assignors to Radio Corporation of America, a corporation of Delaware Filed Oct. 5, 1962, Ser. No. 228,710
6 Claims. (Cl. 178—5.4)

Figure 1:
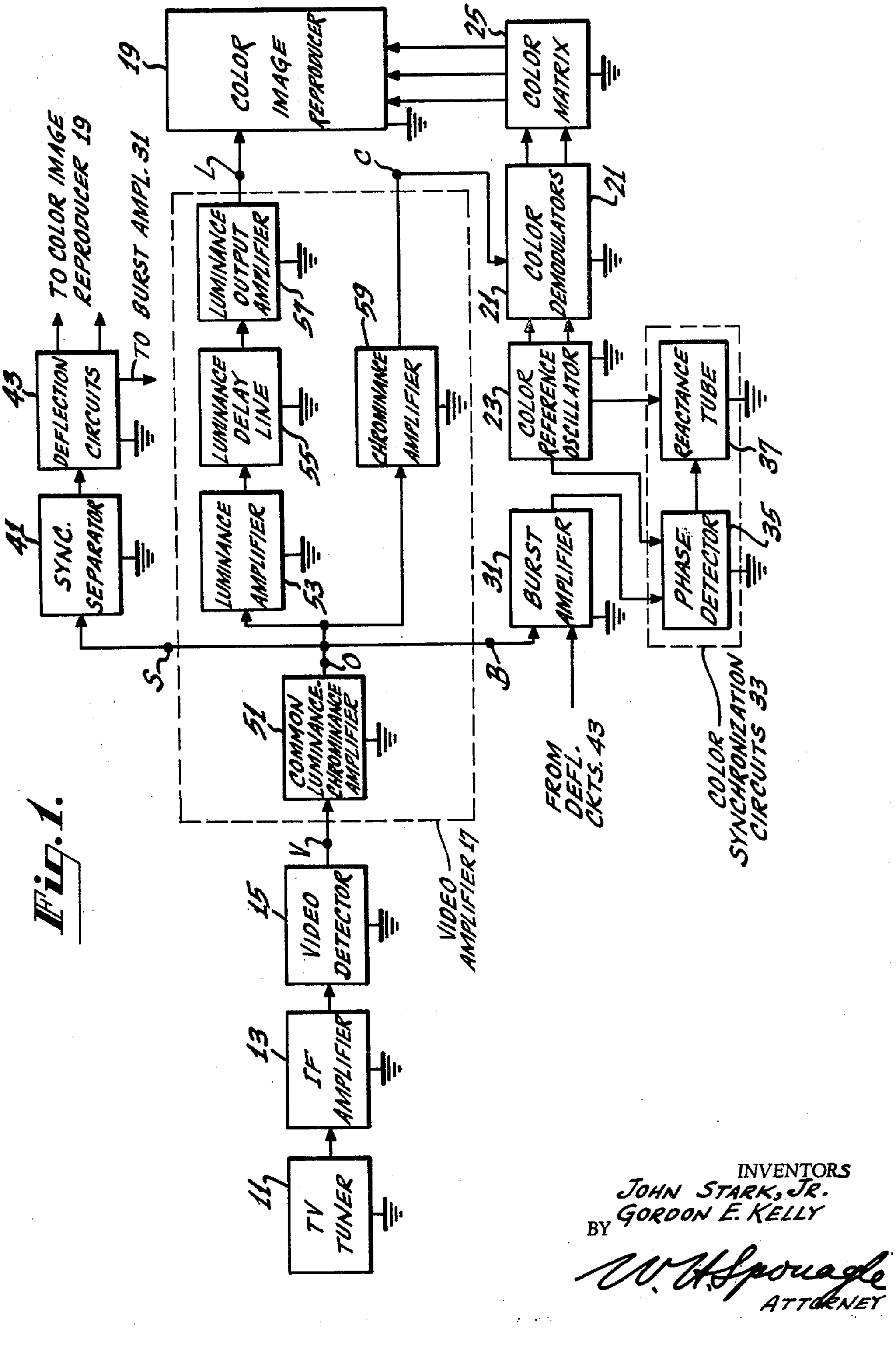

This invention relates generally to color television receiving apparatus, and more particularly to amplifying channels for processing the video output of the second detector (i.e., video detector) of a color television receiver.

It is customary in color television receivers to provide separate amplifying channels for the respective luminance and chrominance components of the standard composite color television video signal developed by the second detector of the color receiver. The luminance channel serves to supply the luminance signal component, with suitable amplification and delay, to the color image reproducing device of the receiver so as to control the monochrome information in the displayed picture. The chrominance channel serves to supply the chrominance signal component, comprising a color subcarrier and its associated sidebands, to the color demodulation circuitry of the color receiver. The outputs of the color demodulators, after suitable processing, are also supplied to the image reproducing device of the receiver to control the hue and saturation of the color information in the displayed picture.

From the point of view of circuit economy, it is generally desired to provide at least one common amplifying stage for both luminance and chrominance components ahead of the separate luminance and chrominance channels, whereby at least a portion of the requisite amplification of the respective components may be achieved by a single device in an economical manner. The luminance channel, chrominance channel, and common amplifier elements referred to above together constitute a video amplifier circuit arrangement satisfying the requirements in a color television receiver for suitable processing of the picture information in the received composite video signal. However, in addition to picture information, the received composite signal includes other signal components, i.e., the horizontal and vertical synchronizing pulses and the color synchronizing bursts, which are subject to various utilizations in the receiver and which also must be suitably processed subsequent to the composite signal detection. The video amplifier circuit arrangement of a color television receiver should be suitably adapted to achieve the proper processing of these synchronizing components.

The present invention is directed to a video amplifier circuit arrangement for a color television receiver which achieves the required processing of both the picture and synchronizing components of a composite color television signal in a manner which minimizes circuit complexities and permits component cost savings without sacrificing performance.

In accordance with a particular embodiment of the present invention, the output of the color receiver's second detector is applied to the control grid of a pentode amplifier, which serves as a common amplifier for the chrominance and luminance components of the received signal, as well as for both the color and deflection synchronizing components thereof. A bandpass chrominance amplifier and a color burst amplifier are each driven by the plate output of the pentode amplifier stage. The required additional amplification of the luminance component of the composite signal is effected using two amplifier stages in cascade driven by the plate output of the common pentode amplifier. The first additional amplifier stage is direct current coupled to the plate of the common pentode amplifier, and operates as a positive grid triode amplifier. By virtue of its positive grid mode of operation, the triode amplifier stage operates at an unusually low value of plate voltage. The grid of the final amplifier stage is D.C. coupled, via the requisite luminance delay line, to the plate of the triode amplifier stage.

With the receiver's second detector poled so as to provide a sync negative output, the three stages of luminance component amplification provide a net phase inversion which results in the appearance of a sync positive signal at the plate of the final amplifier stage, this video signal polarity being suitable for use of this output to drive the cathode or cathodes of the color image reproducing device. The plate circuit of the triode amplifier stage, with its positive grid mode of operation, provides a suitable input termination for the luminance delay line. The plate of the common pentode amplifier stage, providing a sync positive output, is a suitable takeoff point for sync signals to be applied to such receiver circuitry as the synchronizing signal separator, and AGC and noise inverter circuits.

The positive grid operation of the middle stage of the three stage luminance component amplifying channel readily permits direct current coupling from second detector to color image reproducing device without requiring the usual power supply complexity associated with a multistage D.C. amplifier. Positive grid operation of this stage provides the additional advantage of improved linearity of amplification.

It is a primary object of the present invention to provide new and improved video amplifier circuitry for a color television receiver.

It is a further object to provide a color television receiver with a D.C. coupled luminance signal path from detector to reproducer which achieves suitable amplification and delay of the luminance component, and provides convenient takeoff points for the chrominance, deflection synchronizing and color synchronizing components, without unduly complicating the receiver's power supply or requiring the use of expensive circuit elements.

Figure 2:
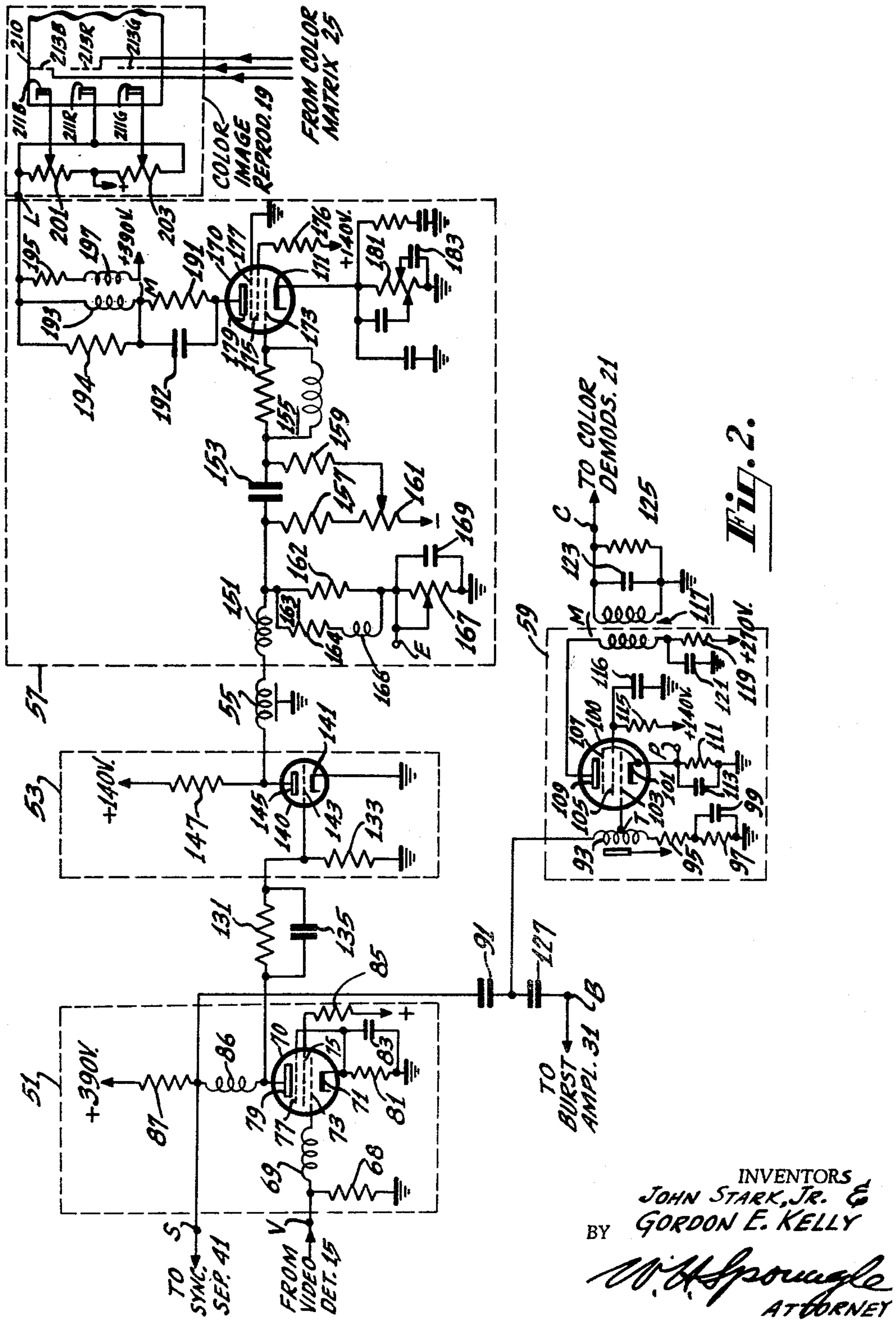

Other objects and advantages of the present invention will be readily appreciated by those skilled in the art upon a reading of the following detailed description and an inspection of the accompanying drawing, in which:

FIGURE 1 illustrates in block form color television receiver apparatus embodying the present invention; and FIGURE 2 illustrates schematically the circuit details of elements of the invention embodiment shown generally in FIGURE 1.

FIGURE 1 illustrates in block form a color television receiver incorporating a video amplifying circuit arrangement in accordance with an embodiment of the present invention. A television tuner 11 is adapted to receive standard broadcast television signals and produce therefrom an intermediate frequency signal comprising an intermediate frequency carrier wave modulated in accordance with a composite television signal. The tuner 11 may be of conventional form, and thus include, for example, RF amplifier, heterodyne oscillator, and mixer stages of well known function and configuration. The output of tuner 11 is supplied to an intermediate frequency amplifier 13, which suitably amplifies the intermediate frequency signal to a level suitable for delivery to a video detector 15. The video detector 15 serves to demodulate the intermediate frequency carrier waves to produce at the detector output terminal V a composite color television video signal output.

The composite video signal output appearing at terminal V is applied to a video amplifier 17 for suitable amplification and processing of the components thereof. The video amplifier 17, the internal arrangement of which will be discussed subsequently, is provided with a luminance output terminal L, to which is delivered a suitably amplified and delayed version of the luminance component of the composite signal. The luminance component output appearing at terminal L is applied to the appropriate input of a color image reproducer 19, which may, for example, take the form of a three-gun shadow-mask kinescope.

The video amplifier 17 is also provided with a chrominance output terminal C, to which is delivered a suitably amplified version of the chrominance component of the composite signal. The chrominance component output appearing at terminal C, comprising phase and amplitude modulated color subcarrier waves, is applied to color demodulators 21 which serve to synchronously detect the applied color subcarrier waves to recover color-difference signal outputs. To effect the desired synchronous detection of the modulated subcarrier, the color demodulators 21 are supplied with suitably phased outputs of a local color reference oscillator 23. The color-difference signal outputs of the color demodulators 21 are applied to color matrix apparatus 25 to develop a set of color-difference signal outputs suitable for application to the color image reproducer 19.

In addition to processing the picture information components (both luminance and chrominance) of the composite signal, the video amplifier 17 also performs some processing of the synchronizing components of the composite signal. Thus, the video amplifier 17 is also provided with a sync take-off terminal S and a burst take-off terminal B. The burst take-off terminal B is coupled to the input of a burst amplifier 31, which is suitably gated to develop, in a time-selective fashion, an amplified version of the periodically recurring color synchronizing bursts. The burst output of burst amplifier 31 is applied to color synchronization circuits 33 to achieve the requisite synchronization of the local color reference oscillator 23. The color synchronization circuits 33 may operate, for example, on well known AFC principles, and thus comprise, as illustrated, a phase detector 35 responding to outputs of burst amplifier 31 and color reference oscillator 23 to develop an error voltage output which is used to vary the reactance presented by a reactance tube 37 to the frequency determining elements of the color reference oscillator 23.

The sync take-off terminal S is coupled to the input of a sync separator 41, which serves, in accordance with well known amplitude selective techniques, to separate the deflection synchronizing components from the remainder of the composite signal. These separated deflection synchronizing components are applied to deflection circuits 43 to synchronize the development therein of suitable deflecting waveforms for application to the appropriate deflecting elements of the color image reproducer 19. Also derived from the deflection circuits 43 is the suitably timed gating waveform required in the operation of the previously mentioned burst amplifier 31.

To provide the above noted outputs at terminals L, C, B and S, the general circuit arrangement of the video amplifier 17 is as follows: The detector output appearing at terminal V is applied to a common luminance-chrominance amplifier 51. The output of the common amplifier 51, comprising an amplified and phase inverted version of the detector output, appears at a common amplifier output terminal O and is applied therefrom to: (1) the sync take-off terminal S, (2) the input of a luminance amplifier stage 53, (3) the input of a chrominance amplifier stage 59, and (4) the burst take-off terminal B. The luminance amplifier 53 amplifies and phase inverts the signal appearing at terminal O, and its output is applied via a luminance delay line 55 to the input of a luminance output amplifier stage 57. The latter stage serves to amplify and phase invert the delayed output of delay line 55 for application to the previously mentioned luminance output terminal L. The chrominance amplifier 59, provided with bandpass determining elements appropriate to the pass band occupied by the color subcarrier and its sidebands, delivers an amplified version of the chrominance component of the composite signal to the previously mentioned chrominance output terminal C.

To appreciate more clearly the functioning of the circuit arrangement of video amplifier 17, reference should now be made to the schematic diagram of FIGURE 2, in which schematic details are shown for various elements of the block diagram of FIGURE 1. The remaining receiver elements may, for example, conform to the details of the corresponding elements of the RCA CTC11 color television receiver chassis (described in the RCA Service Data pamphlet denoted 1961 No. T6).

In FIGURE 2, the composite video signal output of detector 15, inclusive of its D.C. component, appears at the video detector output terminal V, and is applied through a direct current path comprising coil 69 to the control grid 73 of a pentode type amplifier tube 70. The tube 70 serves as the amplifying device of the common luminance-chrominance amplifier stage 51. The control grid 73 is returned to ground via resistor 68, while the cathode 71 of pentode 70 is returned to ground through a cathode bias resistor 81, shunted by a capacitor 83. The values of resistor 81 and capacitor 83 are chosen to provide a cathode circuit serving a well-known peaking function, permitting a small degree of signal degeneration at the lower signal frequencies compared to virtually no degeneration at the higher signal frequencies. The impedence level of this peaking network is chosen to be very small relative to the anode load impedance. The third or suppressor grid 77 of the pentode 70 is returned directly to the cathode 71. The screen grid 75 of the pentode 70 is maintained at a suitable positive operating potential by connection to a positive potential supply through a screen dropping resistor 85.

Positive operating potential is applied to the anode 79 of the pentode 70 by means of a direct current path which consists of anode load resistor 87 in series with a peaking coil 86. An amplified version of the video detector output appears at the anode 79 of the pentode amplifier tube 70, the amplified version retaining the D.C. component of the composite video signal due to the direct coupling between detector and input grid. Due to the absence of any significant signal load in the cathode circuit of amplifier tube 70, essentially the full gain capabilities of the pentode stage are utilized for all components of the applied composite signal.

As noted previously in connection with the block diagram of FIGURE 1, the common amplifier stage 51, in addition to supplying signals to a luminance signal amplifying channel, serves to supply outputs for utilization in respective sync, color burst and chrominance channels. The sync take-off terminal S of common amplifier 51, from which terminal signals are applied to the sync separator 41, is directly connected to the junction between coil 86 and resistor 87 in the anode circuit of tube 70.

A chrominance amplifier stage 59 also derives its input from this junction point. A coupling capacitor 91 applies signals appearing at the junction of coil 86 and resistor 87 to the input terminal of a tuned input transformer 93. The transformer 93, arranged in step-down autotransformer fashion, is tuned to establish a bandpass characteristic encompassing the color subcarrier frequency and sidebands surrounding said subcarrier frequency. The low potential terminal (remote from coupling capacitor 91) of autotransformer 93 is returned to ground via a pair of resistors 95 and 97 in series, resistor 97 being shunted by a capacitor 99.

The step-down output terminal T of transformer 93 is connected to the control grid 103 of a pentode type amplifier tube 100, which serves as the amplifying device of the chrominance amplifier stage 59. The cathode 101 of pentode 100 is grounded through a cathode bias resistor III, shunted by a capacitor 113 which bypasses the resistor 111 for chrominance signal frequencies. The cathode 101 is connected to a pulse input terminal P to which positive-going pulses, timed to recur during each burst interval, are applied to cut off pentode 100 during the burst intervals. The screen 105, bypassed to ground by capacitor 116, is returned to a source of positive operating potential via a screen dropping resistor 115. The suppressor grid 107 is directly connected to the cathode 101 of the tube 100.

The anode load for tube 100 comprises the primary winding of a tuned output transformer 117, the tuning of the transformer further defining the desired chrominance bandpass characteristic about the color subcarrier frequency. The primary of transformer 117 links the anode 109 to an operating potential source via an anode dropping resistor 119, suitably bypassed by capacitor 121. The secondary winding of output transformer 117, shunted by a capacitor 123 and by a resistor 125, is grounded at one terminus. The other terminus of the output winding of transformer 117 is directly connected to the chrominance output terminal C from which signals are supplied to the color demodulators 21 of the FIGURE 1 arrangement.

The burst take-off terminal B of the common amplifier stage 51, from which terminal signals are applied to the burst amplifier 31 of the FIGURE 1 arrangement, is shown in FIGURE 2 as coupled to the coil 86-resistor 87 junction point in the anode circuit of tube 70 by a signal path comprising a coupling capacitor 127 in series with the previously mentioned coupling capacitor 91.

Derivation of signals for luminance channel use from tube 70 relies upon additional circuitry associated with the anode 79. A resistive voltage divider consisting of a coupling resistor 131 in series with a grid resistor 133 is directly connected between anode 79 and ground. The resistor 131 is shunted by a coupling capacitor 135. The control grid 143 of a triode type amplifier tube 140, which serves as the amplifying device of the luminance amplifier stage 53, is directly connected to the junction of resistors 131 and 133. A direct current path, consisting of resistor 131, is thus provided between the output electrode (anode 79) of amplifier tube 70 and the input electrode (control grid 143) of amplifier tube 140. The cathode 141 of tube 140 is directly grounded. The anode 145 of triode 140 is connected to a source of positive operating potential through an anode load resistor 147. The division of operating D.C. potential effected by resistors 131 and 133 biases grid 143 sufficiently positive with respect to the grounded cathode 141 to continuously maintain triode 140 in the state of drawing grid current.

The anode 145 of triode 140 is directly connected to the input terminal of the luminance delay line 55. The output terminal of delay line 55 is coupled to the control grid 173 of a pentode-type amplifier tube 170 which serves as the amplifying device of the luminance output amplifier stage 57. The coupling between the delay line output terminal and control grid 173 includes, in series, a series peaking coil 151, a coupling capacitor 153 and the parallel LR (inductance-resistance) combination 155. A direct current path for signals around the coupling capacitor 153 is provided by resistors 157 and 159 in series with a selectable portion of the resistance of potentiometer 161. One end terminal of potentiometer 161 is connected to one end of resistor 157; the latter is connected at its other end to the input side of coupling capacitor 153. The adjustable tap of potentiometer 161 is connected to one end of resistor 159; the latter is connected at its opposite end to the output side of coupling capacitor 153. The remaining end terminal of potentiometer 161 is returned to a suitable source of negative biasing potential.

The potentiometer 161 serves as a brightness control of the color television receiver, and serves to vary the ratio of D.C. to A.C. components in the luminance signal supplied to the reproducer in accordance with variations in brightness setting. For a more detailed explanation of the principles of operation of such a brightness control arrangement, reference may be made to U.S. Patent No. 2,872,617, issued to John Stark, Jr. and Leonard Dietch on February 3, 1959, and entitled "Color Television Receiver Brightness Control."

The junction between coil 151 and capacitor 153 is returned to ground through a network 163 in series with a variable resistor 167, the variable resistor 167 being bypassed for signal frequencies by capacitor 169. The network 163 comprises a resistor 162 shunted by the series combination of resistor 164 and a coil 166. The network 163, in cooperation with coil 151 provides a suitable receiving end termination for the delay line 55 with the proper video frequency response. The variable resistor 167 serves to provide an adjustable positive biasing potential at its ungrounded end terminal E for use elsewhere in the receiver; it has no significant effect, in its adjustment, on the signal supplied to the amplifier tube 170. (A particular use for the potential provided at terminal E is as an adjustable threshold potential for a keyed AGC tube such as employed in the previously mentioned CTC11 color receiver; the advantage of deriving such a threshold potential in the manner shown in FIGURE 2 is that the derived potential is responsive to the D.C. component of the composite signal whereby a desired operating mode of providing greater receiver gain on "black" pictures relative to "white" pictures may be automatically achieved.)

The cathode 171 of tube 170 is returned to ground via a cathode resistance 181; a selectable portion of the resistance 181 is bypassed for signal frequencies by capacitor 183. The resistance 181 comprises the resistance presented between the fixed end terminals of a potentiometer, the capacitor 183 being coupled between the adjustable tap of the potentiometer and the grounded end terminal thereof; the potentiometer serves as the contrast control for the receiver, the tap adjustment determining the amount of degeneration, if any, provided by the cathode circuit associated with amplifier tube 170. Additional cathode circuit elements, in shunt with all or a portion of resistance 181 assure a proper frequency response from the output amplifier stage 57 at all settings of the contrast control.

The screen grid 175 of amplifier tube 170 is connected to a suitable source of operating potential via screen dropping resistor 176. The third or suppressor grid 177 of tube 170 is directly grounded. The anode 179 of tube 170 is connected to a source of positive operating potential via a path which includes a dropping resistor 191 (shunted by capacitor 192), a series peaking coil 193 (shunted by a resistor 194); a load resistor 195 and a shunt peaking coil 197. The peaking effect provided by peaking coils 193 and 197 is enhanced by the provision of mutual inductive coupling therebetween.

The luminance output terminal L, connected to the junction between the series peaking coil 193 and load resistor 195, is directly connected to the cathode 211R of the red gun of the tri-gun, shadow-mask color kinescope 210 (only partially shown) serving as the reproducing device of color image reproducer. The cathodes 211B and 211G, of the blue and green guns, respectively, of kinescope 210 (which may, for example, be a type 21FJP22 tube) are supplied with luminance signals from terminal L via the adjustable taps of drive adjusting potentiometers 201 and 203, respectively; the resistive elements of each of the potentiometers 201 and 203 are directly connected between terminal L and a source of positive biasing potential. The control grids 213B, 213R and 213G of the blue, red and green guns of kinescope 210 are supplied with respective blue, red and green color-difference signal outputs of color matrix 25.

The advantages of the video amplifier 17 arrangement shown in block form in FIGURE 1, and set forth in detail in FIGURE 2, are significant and multifold. The amplifier stage 51 provides a common stage for amplification of the luminance and chrominance video components and of the deflection and color synchronizing components. In contrast with prior art arrangements, substantially no signal load appears in the cathode circuit of the amplifier tube 70, whereby the single anode load permits use of the full gain capabilities of the amplifier tube for all of the noted components. This amplifier stage 51 may be associated with a video detector 15 of the conventionally desired polarity (i.e., providing a composite output in which the deflection synchronizing pulses are negative-going). Due to the phase inversion provided by amplifying stage 51, the signals appearing at the sync takeoff terminal S, directly connected to the anode load resistor 87, are of the appropriate polarity for application to a conventional sync separator 41 (i.e., the signal polarity is such that the deflection synchronizing pulses are positive-going). This signal polarity is, of course, also appropriate for application to keyed AGC circuitry of known types, such as that employed in the previously mentioned RCA CTC11 color television receiver.

The anode circuit of amplifier stage 51 also provides a suitable takeoff point for the chrominance and color synchronizing burst components of the composite color television signal. Adequate isolation of such a takeoff point from the input of the luminance channel delay line 55 is assured by the interposition of the positively biased triode luminance amplifier stage 53 between the chrominance and burst takeoff point and the delay line input. By operating the triode 140 of the amplifier stage 53 in a positively biased grid mode, direct coupling of the grid to the output of stage 51 is readily achieved with the cathode of tube 140 maintained at ground potential. By virtue of its positive grid mode of operation, tube 140 presents an appropriately low output impedance at its anode, thus providing a suitable input termination for the luminance delay line 55; i.e., the very low output impedance of the positive grid amplifier facilitates matching the surge impedance of the delay line 55, whereby the signal disturbances caused by any delay line mistermination are avoided. Also, by virtue of its operation in the positive grid mode, triode 140 has a low operating D.C. potential at its anode, which facilitates the use of direct coupling from this anode to the input grid of the luminance output amplifier stage 57. Triode 140, in its positive gride mode of operation, provides signal gain of the order of 3 to 5 with excellent amplification linearity, and serves to phase invert the positive-sync video output of the stage 51 to a negative-sync polarity. This latter polarity is the appropriate one for driving an output amplifier stage, such as stage 57, where the output is to be applied to the cathode or cathodes of the color kinescope serving as the image reproducer 19.

The output amplifier stage 57 completes the gain for the luminance component, and continues the direct coupling of signals on to the color reproducer whereby the direct component of the detected signal is transmitted through the entire three stages of amplification to the reproducer. The circuitry associated with the output amplifier stage 57 provides a suitable output termination for the delay line 55, achievement of the desired frequency response for the luminance component to be applied to the reproducer, and achievement of control of the brightness and contrast of the image to be reproduced thereby.

A particular set of values for the circuit constants of the amplifier arrangement of FIGURE 2, which has provided satisfactory operation, is set forth below. It will be appreciated that these values are given by way of example only:

| | |
|---|---|
| Resistor **68** | 12,000 ohms. |
| Resistor **81** | 56 ohms. |
| Resistor **85** | 220 ohms. |
| Resistor **87** | 12,000 ohms. |
| Resistor **95** | 330 ohms. |
| Resistor **97** | 220,000 ohms. |
| Resistor **111** | 390 ohms. |
| Resistor **115** | 1,000 ohms. |
| Resistor **119** | 1,500 ohms. |
| Resistor **125** | 560 ohms. |
| Resistor **131** | 68,000 ohms. |
| Resistor **133** | 27,000 ohms. |
| Resistor **147** | 6,800 ohms. |
| Resistor **155** | 2,200 ohms. |
| Resistor **157** | 270,000 ohms. |
| Resistor **159** | 330,000 ohms. |
| Resistor **161** | 250,000 ohms. |
| Resistor **162** | 10,000 ohms. |
| Resistor **164** | 2,200 ohms. |
| Resistor **167** | 6,000 ohms. |
| Resistor **176** | 100 ohms. |
| Resistor **181** | 368 ohms. |
| Resistor **191** | 2,700 ohms. |
| Resistor **194** | 18,000 ohms. |
| Resistor **195** | 5,600 ohms. |
| Resistor **201** | 5,000 ohms. |
| Resistor **203** | 5,000 ohms. |
| Capacitor **83** | 3,300 micromicrofarads. |
| Capacitor **91** | 18 micromicrofarads. |
| Capacitor **99** | .047 microfarad. |
| Capacitor **113** | 820 micromicorfarads. |
| Capacitor **116** | .01 microfarad. |
| Capacitor **121** | 1,000 micromicrofarads. |
| Capacitor **123** | 330 micromicrofarads. |
| Capacitor **127** | 120 micromicrofarads. |
| Capacitor **135** | 5 micromicrofarads. |
| Capacitor **153** | 0.1 microfarad. |
| Capacitor **169** | 40 microfarads. |
| Capacitor **183** | 50 microfarads. |
| Capacitor **192** | 1,000 micromicrofarads. |
| Coil **69** | 36 microhenries. |
| Coil **86** | 5.6 microhenries. |
| Coil **151** | 72 microhenries. |
| Coil **155** | 120 microhenries. |
| Coil **166** | 62 microhenries. |
| Tube **70** | ½ 6AW8A. |
| Tube **100** | ½ 6EA8. |
| Tube **140** | ½ 6AW8A. |
| Tube **170** | 12BY7A. |
| Tube **210** | 21FJP22. |
| Delay Line **55** | approx. 1,600 ohms. |

What is claimed is:

1. In a color television receiver including a video detector developing in response to signals applied thereto a composite color video output signal including a luminance component, a chrominance component, a deflection synchronizing component and a color synchronizing component, apparatus comprising the combination of:

a first video signal amplifying means, direct current conductively connected to said video detector and having a load circuit, for developing in said load circuit an amplified and phase inverted version of the composite signal output of said video detector;

means for utilizing said chrominance component;

means for utilizing said deflection synchronizing component;

means for utilizing said color synchronizing component;

respective means for applying signals developed in said load circuit to each of said chrominance, deflection synchronizing and color synchronizing component utilization means;

a triode having a cathode, a control grid, and an anode;

a direct current conductive connection from said load circuit to said control grid;

means, including said direct current conductive connection for maintaining said control grid positively biased with respect to said cathode;

a load impedance connected between said anode and a source of direct current potential;

a delay line;

a luminance output amplifier having an input electrode and an output electrode;

means including said delay line for providing a direct current conductive connection between said anode and said input electrode;

and means for utilizing said luminance component, said luminance component utilization means being direct current conductively connected to said output electrode.

2. In a color television receiver including a source of composite color viedo signals comprising deflection synchronizing pulses and luminance video signals having a D.C. component, the polarity of said composite signal being such that said deflection synchronizing pulses are negative-going, and also including a color kinescope having a cathode electrode, luminance signal amplifying apparatus for delivering to said cathode electrode an amplified version of said luminance video signals, with a polarity opposite to the polarity of the signals provided by said source, said apparatus comprising the combination of:

first, second and third amplifying stages in cascade interposed between said source and said cathode electrode;

signal couplings (1) between said source and said first amplifying stage, (2) between said first amplyfying stage and said second amplifying stage, (3) between said second amplifying stage and said third amplifying stage, and (4) between said third amplifying stage and said cathode electrode, each of said couplings including a direct current conductive path whereby the luminance signals delivered by said apparatus to said cathode electrode include said D.C. component;

said second amplifying stage comprising a triode having a control grid positively biased so as to continuously draw grid current;

and a luminance delay line included in the coupling between said second and third amplifying stages.

3. In a color television receiver including a source of composite color video signals comprising deflection synchronizing pulses and luminance video signals having a D.C. component, the polarity of said composite signal being such that said deflection synchronizing pulses are negative-going, and also including a color kinescope having a cathode electrode, luminance signal amplifying apparatus for delivering to said cathode electrode an amplified version of said luminance video signals, with a polarity opposite to the polarity of the signals provided by said source, said apparatus comprising the combination of:

first, second and third amplifying stages in cascade interposed between said source and said cathode electrode;

signal couplings (1) between said source and said first amplifying stage, (2) between said first amplifying stage and said second amplifying stage, (3) between said second amplifying stage and said third amplifying stage, and (4) between said third amplifying stage and said cathode electrode, each of said couplings including a direct current conductive path whereby the luminance signals delivered by said apparatus to said cathode electrode include said D.C. component;

said second amplifying stage comprising a triode having a control grid positively biased so as to continuously draw grid current, and having an anode coupled to an anode load impedance;

and a luminance delay line included in the coupling between said second and third amplifying stages, the output impedance presented by said triode being sufficiently low as to establish in conjunction with said anode load impedance an input termination for said luminance delay line which is substantially equal in impedance to the surge impedance of said luminance delay line.

4. In a color television receiver including a color kinescope having a cathode electrode, and a source of composite color video signals comprising deflection synchronizing pulses and luminance video signals having a D.C. component, the polarity of said composite signal being such that said deflection synchronizing pulses are negative-going, said composite color video signals also including a chrominance component and a color synchronizing component, luminance signal amplifying apparatus for delivering to said cathode electrode an amplified version of said luminance video signals, with a polarity opposite to the polarity of the signals provided by said source, said apparatus comprising the combination of:

first, second and third amplifying stages in cascade interposed between said source and said cathode electrode;

signal couplings (1) between said source and said first amplifying stage, (2) between said first amplifying stage and said second amplifying stage, (3) between said second amplifying stage and said third amplifying stage, and (4) between said third amplifying stage and said cathode electrode, each of said couplings including a direct current conductive path whereby the luminance signals delivered by said apparatus to said cathode electrode include said D.C. component;

said second amplifying stage comprising a triode having a control grid positively biased so as to continuously draw grid current, and having an anode coupled to an anode load impedance;

a luminance delay line included in the coupling between said second and third amplifying stages, the output impedance presented by said triode being sufficiently low as to establish in conjunction with said anode load impedance an input termination which is substantially equal in impedance to the surge impedance of said luminance delay line;

chrominance component utilization means;

color synchronizing component utilization means;

and means for applying the output of said first amplifying stage to said chrominance and color synchronizing component utilization means.

5. In a color television receiver including a color kinescope having a cathode electrode, and a source of composite color video signals comprising deflection synchronizing pulses and luminance video signals having a D.C. component, the polarity of said composite signal being such that said deflection synchronizing pulses are negative-going, said composite color video signals also including a chrominance component and a color synchronizing component, luminance signal amplifying apparatus for delivering to said cathode electrode an amplified version of said luminance video signals, with a polarity opposite to the polarity of the signals provided by said source, said apparatus comprising the combination of:

first, second and third amplifying stages in cascade interposed between said source and said cathode electrode;

signal couplings (1) between said source and said first amplifying stage, (2) between said first amplifying stage and said second amplifying stage, (3) between said second amplifying stage and said third amplifying stage, and (4) between said third amplifying stage and said cathode electrode, all of said couplings including a direct current conductive path whereby the luminance signals delivered by said apparatus to said cathode electrode include said D.C. component;

said second amplifying stage comprising a triode having a control grid positively biased so as to continuously draw grid current;

a luminance delay line included in the coupling between said second and third amplifying stages;

chrominance component utilization means;

color synchronizing component utilization means;

deflection synchronizing component utilization means; and means for applying the output of said first amplifying stage to said deflection synchronizing, chrominance and color synchronizing component utilization means.

6. In a color television receiver including a color kinescope having a cathode electrode, and a source of composite color video signals comprising chrominance signals, deflection synchronizing pulses and luminance signals having a D.C. component, the polarity of said composite signal being such that said deflection synchronizing pulses are negative-going, said receiver also including a common amplifying stage for all of said components of said composite video signals, and a luminance signal amplifying stage delivering an output to said kinescope cathode electrode, apparatus for delivering a delayed, phase inverted and amplified version of the output of said common amplifying stage, inclusive of said D.C. component, to the input of said luminance signal amplifying stage, said apparatus comprising in combination:

a triode having cathode, control grid and anode electrodes;

means for maintaining said triode cathode electrode at a signal reference potential;

means for providing a direct current conductive signal path between the output of said common amplifying stage and said control grid;

means including said direct current path for biasing said control grid sufficiently positively with respect to said signal reference potential so that said control grid draws current under all signal conditions;

load impedance means coupling said anode electrode to a source of positive operating potential;

a delay line having an input terminal and an output terminal;

means providing a direct current conductive connection between the input terminal of said delay line and said anode electrode;

and means providing a direct current conductive connection between the output terminal of said delay line and the input of said luminance amplifying stage.

References Cited by the Examiner

UNITED STATES PATENTS 1,944,574 1/34 Roberts -------------- 330—173

DAVID G. REDINBAUGH, *Primary Examiner.*